Apr. 24, 1923.
F. H. SANDS
1,453,190
HORSE DRAWN CYCL
Filed June 16, 1922
2 Sheets-Sheet 1
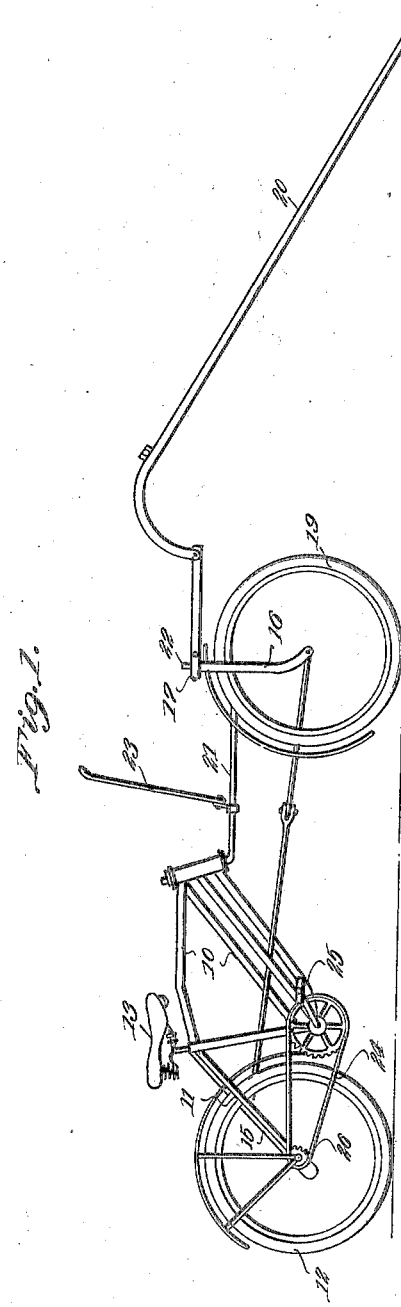
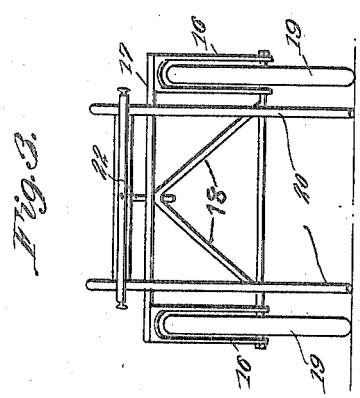
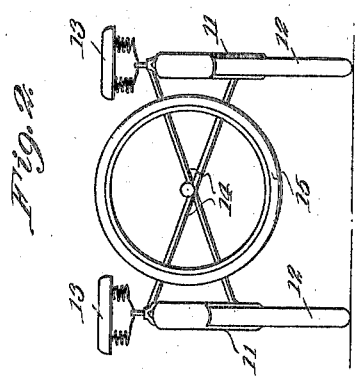
F. H. Sands
INVENTOR
BY Victor J. Evans
ATTORNEY

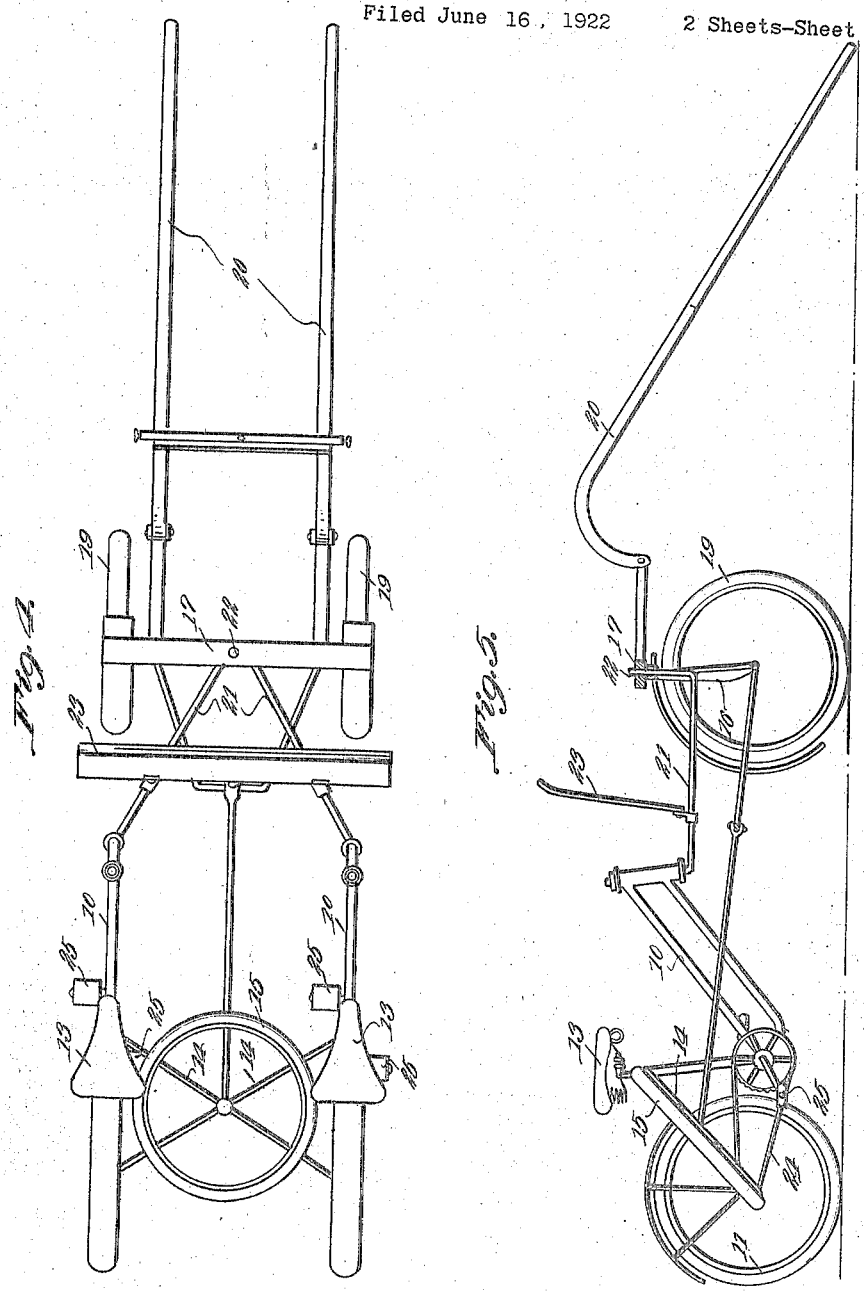

Patented Apr. 24, 1923.

1,453,190

UNITED STATES PATENT OFFICE.

FILANDRO HENRY SANDS, OF NASSAU, BAHAMA ISLANDS.

HORSE-DRAWN CYCLE.

Application filed June 16, 1922. Serial No. 568,758.

*To all whom it may concern:*

Be it known that I, FILANDRO H. SANDS, residing at Nassau, N. P., Bahamas, have invented new and useful Improvements in Horse-Drawn Cycles, of which the following is a specification.

This invention relates to improvements in vehicles and has for an object the provision of a horse drawn vehicle of novel construction, which is light in weight, easy running and in addition possesses comfortable and easy riding qualities.

Another object of the invention is the provision of a horse drawn vehicle having means for assisting in the propulsion of the vehicle, together with means for braking the same, said propelling and braking means including an operating means common to both.

With the above and other objects in view, the invention further includes the following novel features and details of construction, to be hereinafter more fully described, illustrated in the accompanying drawings and pointed out in the appended claims.

In the drawings:—

Figure 1 is a side elevation of a vehicle constructed in accordance with the invention.

Figure 2 is a rear elevation of the same.

Figure 3 is a front view.

Figure 4 is a plan view.

Figure 5 is a central longitudinal sectional view.

Referring in detail to the drawings, wherein like characters of reference denote corresponding parts, the reference character 10 indicates a pair of frames which are arranged in spaced parallel relation. These frames are preferably formed of bicycle frames and may be of like construction, or one may be of the type usually ridden by males and the other of the type usually ridden by females. The frames are each provided with the usual rear forks 11, between which are mounted wheels 12, while above these forks at the top of the frames there is provided seats or saddles 13.

The frames 10 are connected together by means of transverse braces 14, certain of which provide means for removably holding a spare wheel 15.

The front forks of the usual bicycle frames are removed from the frames 10 and these forks which are indicated at 16 are connected together by a front transverse bar 17, while suitable braces 18 connect the forks 16 and the bar 17 so that the said forks will be rigid. The front forks 16 have mounted therein wheels 19 and the forks 16 and bar 17 provide a frame to which is connected a pair of shafts 20.

The frames 10 and the front bar 17 of the front frame are pivotally connected together and for this purpose the frames 10 have extending forwardly therefrom a frame 21 which has a pivotal connection as at 22 with the bar 17. A dash 23 is preferably located in advance of the frames 10.

The invention as thus far described provides a novel light and easy running vehicle which may be used for comfortable travel over roads of any character and in order to assist in propelling the vehicle so as to increase the speed of travel when desired and to relieve the horse or other draft animal of a portion of the load, the usual bicycle drive is utilized. This includes the chain and sprocket drive 24 and foot pedals 25, while an ordinary coaster brake 26 is also provided. By this means, either one or both of the occupants of the vehicle may assist in its propulsion, while the coaster brakes may be used to stop or retard the progress of the vehicle, in the event of the draft animal becoming unruly or to relieve the animal of the weight of the vehicle and its occupants when travelling down hill. The coaster brake mechanism also provides means whereby the occupants may use the pedals as foot rests without either aiding in the propulsion or retarding movement of the vehicle.

The invention is susceptible of various changes in its form, proportions and minor details of constructon and the right is herein reserved to make such changes as properly fall within the scope of the appended claims.

Having described the invention what is claimed is:—

1. A vehicle embodying a pair of spaced parallel frames, means connecting the frames, a fork located at the rear end of each of the frames, wheels mounted within the forks, a transversely disposed front frame, a wheel mounted for rotation at each end thereof, means pivotally connecting the front frame to the front ends of the spaced parallel frames, a seat mounted upon each of the last mentioned frames and shafts connected to the front frame.

2. A vehicle embodying a pair of spaced parallel frames, means connecting the frames, a fork located at the front end of each of the frames, wheels mounted within the forks, a transversely disposed front frame including a horizontal bar and a fork at each end thereof, a wheel mounted for rotation in each fork, means pivotally connecting the front frame to the front ends of the spaced parallel members, a seat mounted upon each of the last mentioned frames and shafts connected to the front frame.

In testimony whereof I affix my signature.

FILANDRO HENRY SANDS.